United States Patent
Araki et al.

[11] Patent Number: 5,080,738
[45] Date of Patent: Jan. 14, 1992

[54] ASSEMBLING METHOD FOR FORMING BEAD ASSEMBLY FOR AUTOMOBILE TIRES

[75] Inventors: Katsuji Araki; Hitoshi Kawashima; Isao Kaminaka, all of Hyogo; Yasukiyo Ohira, Miyagi, all of Japan

[73] Assignee: Toyo Tire & Rubber Co., Ltd., Osaka, Japan

[21] Appl. No.: 442,044

[22] Filed: Nov. 27, 1989

[51] Int. Cl.$^5$ .............................................. B29D 30/32
[52] U.S. Cl. .................................... 156/136; 156/135; 156/414; 156/460; 156/132; 156/422; 156/401
[58] Field of Search ............ 156/131, 132, 135, 130.7, 156/136, 414, 401, 422, 460

[56] References Cited

U.S. PATENT DOCUMENTS

| | | | |
|---|---|---|---|
| 4,163,683 | 8/1979 | Lammlein, Jr. | 156/136 |
| 4,229,246 | 10/1980 | Vanderzee | 156/132 |
| 4,410,389 | 10/1983 | Cole et al. | 156/136 |

*Primary Examiner*—Michael W. Ball
*Assistant Examiner*—Francis J. Lerin
*Attorney, Agent, or Firm*—Jordan and Hamburg

[57] ABSTRACT

A method for forming an automobile bead assembly comprises three series of steps. The first series includes placing a bead ring onto the smaller-diameter side surface of a taper drum, winding a bead filler around the peripheral surface of the taper drum such that the thick-walled portion thereof projects over the smaller diameter surface of the drum, bonding the ends of the filler together, bending the thick-walled portion along the smaller-diameter side edge to join it to the bead ring, and separating the front end portion of the filler from the peripheral surface of the drum. The second series includes winding a side ply around the outer periphery of a cylindrical forming drum, bonding the ends together, winding a bead flipper around the side ply while part of the flipper overlaps the side ply, and joining the ends of the flipper together. The third series includes removing the filler/bead ring subassembly from the taper drum and placing it onto the single layer of the flipper on the forming drum, bending the inward portion of the flipper such that it extends along the inside of the bead ring and filler, bending the portion of the flipper and side ply, which projects outwardly of the bead ring such that it extends along the outer surfaces of the filler/bead ring, and bending the overlap region of the flipper, side ply and filler such that the side ply lies on the periphery thereby providing a conical form.

1 Claim, 8 Drawing Sheets

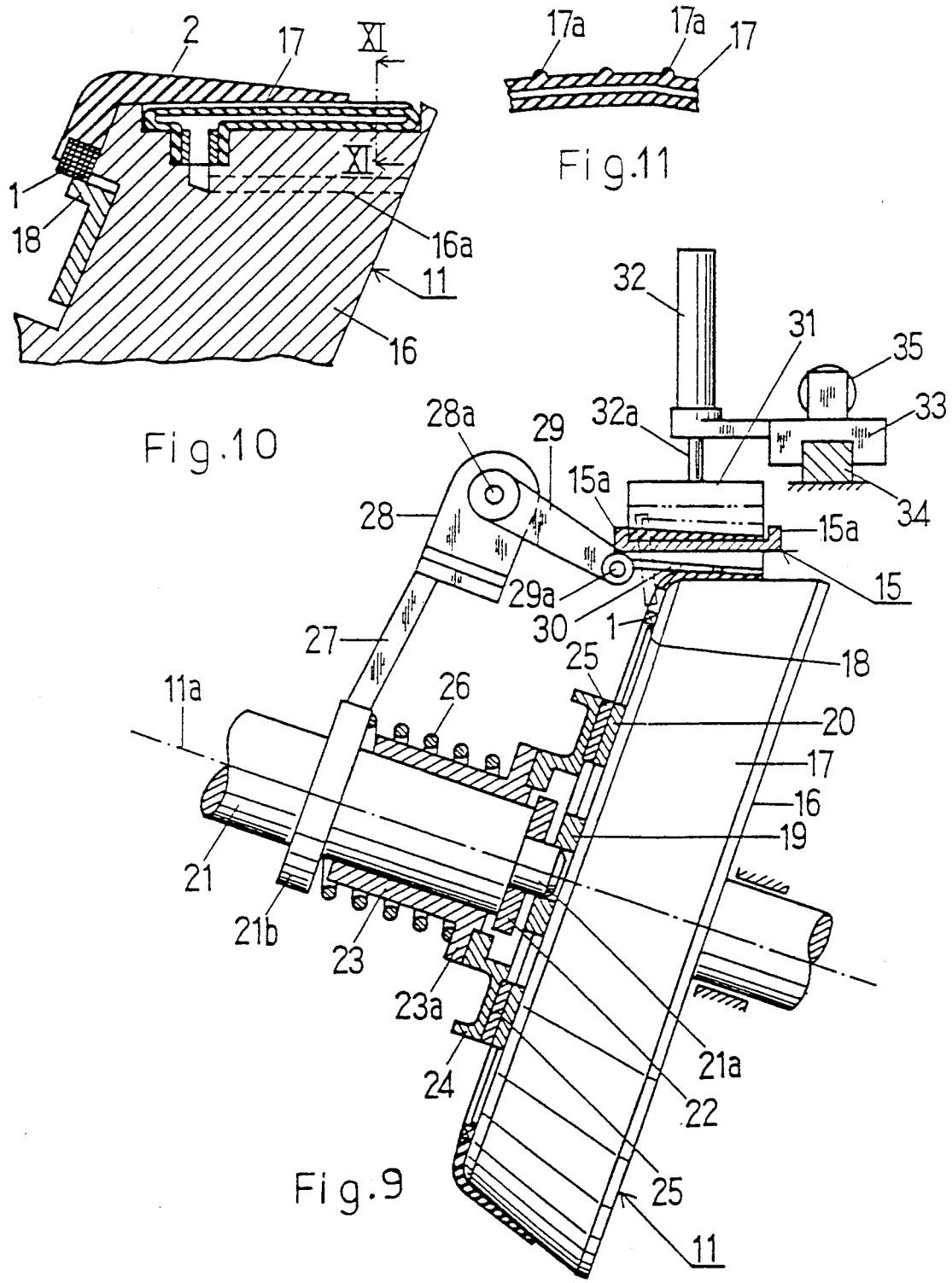

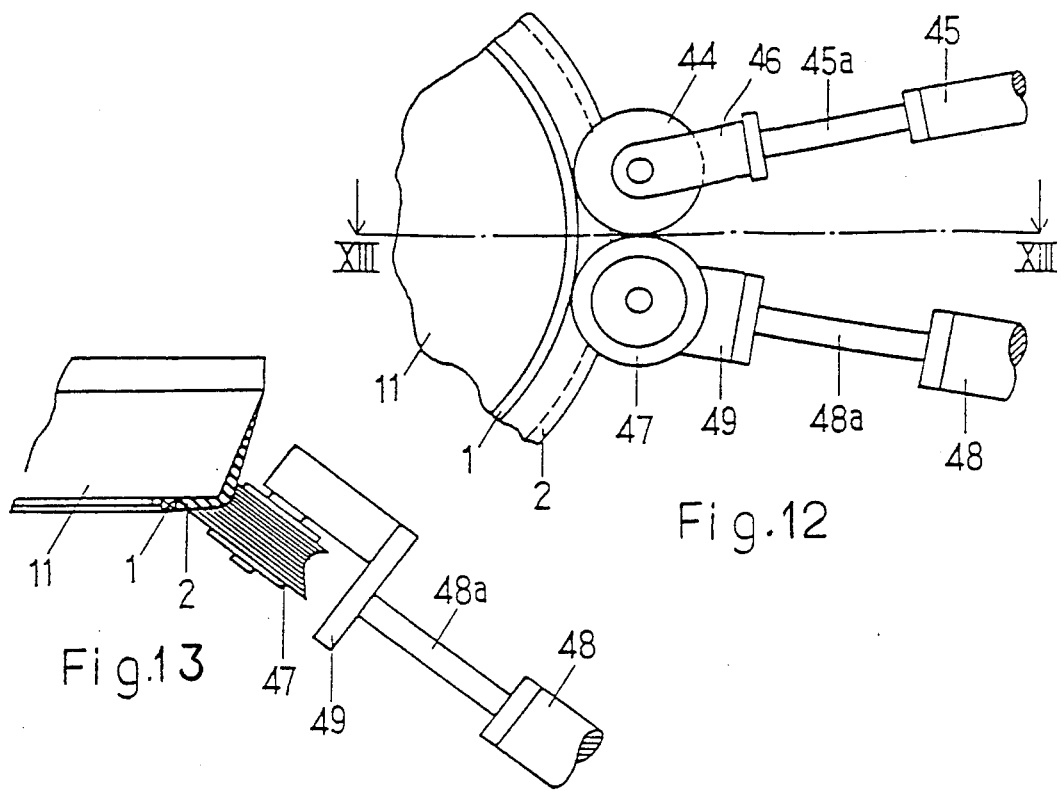
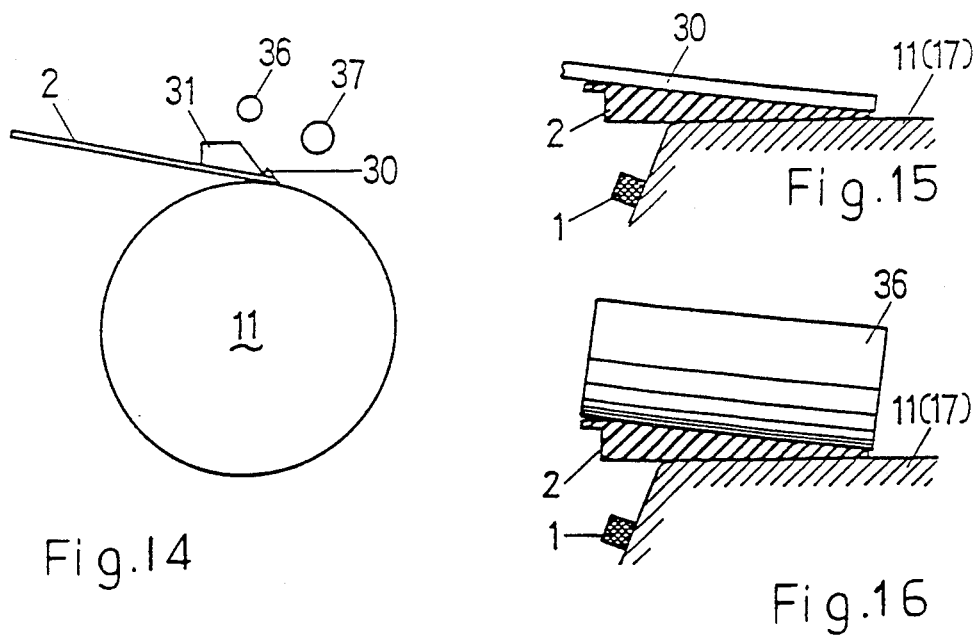

5,080,738

ASSEMBLING METHOD FOR FORMING BEAD ASSEMBLY FOR AUTOMOBILE TIRES

BACKGROUND OF THE INVENTION

1. Technical Field

This invention relates to an assembling method for forming a bead assembly for automobile tires which consists of a bead ring, a bead filler, a bead flipper and a side ply, an assembling apparatus therefor, and a bead filler/bead ring subassembly forming apparatus.

2. Technical Background

A bead assembly for automobiles tires is known, which, as shown in FIG. 26, comprises a wedge-shaped bead filler 2 bonded to the outer peripheral surface of a bead ring 1, a flipper 3 covering the bonded region from inside, and a side ply 4 bonded to the outer lateral surface of the flipper 3. And an example of an apparatus for joining the bead filler 2 to the outer peripheral surface of said bead ring 1 is described in Japanese Patent Publication No. 51540/1986. This apparatus, as shown in FIG. 27 in the present application, comprises a bead driving drum 5 having a groove 5a on the outer periphery, and a pair of dish-shaped pressing disks 6, with the bead ring 1 being fitted in the groove 5a of the bead driving drum 5 to be thereby rotated while the bead filler 2 is tangentially fed to the outer periphery of the bead ring 1, so that the bead filler 2 is nipped between the pressing disks 6 which press the bead filler 2 therebetween.

An example of an apparatus for assembling the bead filler/bead ring subassembly, the bead flipper 3 and the side ply 4 is shown in Japanese Patent Publication No. 18240/1972. This apparatus comprises a pair of turn-up bladders axially juxtaposed for contact with the outer periphery of a cylindrical drum, and bell-shaped frames disposed on opposite sides of the cylindrical drum. In operation, the flipper is wound around the turn-up bladders, followed by the side ply being wound around one side of the flipper, whereupon the pair of turn-up bladders are inflated to raise the flipper on one side and the flipper on the opposite side and the side ply so as to press the flipper on one side against one side of the bead filler while pressing the other flipper on the opposite side together with the side ply against the opposite side of the bead filler. And in this state, the frames on opposite sides are moved forward to nip the turn-up bladders under pressure, thereby pressing the flipper and side ply strongly against the bead filler/bead ring subassembly to connect them together.

Since the bead filler 2 is produced in the form of a strip of wedge-shaped cross section, the bead filler 2 is bent with its thick-walled base portion directed inward when the thick-walled side edge of the bead filler 2 is bonded to the outer peripheral surface of the bead ring 1. As a result, the base portion is compressed in the direction of the length (which is perpendicular to the paper surface of FIG. 27) while the front edge of the opposite thin-walled side is elongated in the direction of the length. Recently, there has come to be used a high bead filler which is a modification of the bead filler 2 made by considerably increasing its width B as compared with its thickness t. In the case of the high bead filler, the elongation of the front edge portion increases until it can hardly be elongated any more, thus presenting the problem of the so-called end gapping which defines a triangular gap between the opposite ends of the bead filler 2 when the latter has been wound a complete turn around the outer periphery of the bead ring 1.

Further, according to the method of assembling the bead ring, bead filler, flipper and side ply as described in the aforementioned Japanese Patent Publication No. 18240/1972, since the flipper extending in opposite directions from the fitted region of the bead ring is bent by inflating the turn-up bladders and since the exhaust is effected by the self contraction of the turn-up bladders, the operation takes a long time and can hardly be automated.

This invention provides a method of automatically assembling the bead ring, bead filler, flipper and side ply, which method eliminates the aforementioned end gapping, an assembling apparatus suitable for use in the method, and a bead filler/bead ring subassembly forming apparatus.

SUMMARY OF THE INVENTION

In the following description, reference will be made to the drawings for the sake of understanding.

To attain the object described above, the present method, using a taper drum 11 as shown in FIG. 1, comprises a first process which comprises temporarily fixing a bead ring 1 to the smaller-diameter side surface of the taper drum 11, winding a bead filler 2 around the peripheral surface of the taper drum 11 so that the thick-walled portion thereof projects beyond the smaller-diameter side of the taper drum 11, bonding the ends of the bead filler 2 together, bending the thick-walled base portion of the bead filler along the smaller diameter side edge to join it to the outer periphery of said bead ring 1 (see FIG. 1), and separating the front end portion of the bead filler 2 from the peripheral surface of the taper drum 11 (see FIG. 2); a second process which comprises winding a side ply 4 around the outer periphery of a cylindrical forming drum 83 (see FIG. 3), bonding ends of the side ply 4 together, winding a bead flipper 3 around the upper surface of, the side ply 4 so that part of the bead flipper projects beyond the edge of the side ply 4 to overlap the latter, and joining ends of the bead flipper 3 together; and a third process which comprises removing the bead filler/bead ring subassembly from the taper drum 11 and fitting it on the single layer of the bead flipper 3 alone disposed on the forming drum 83 (see FIG. 4), erecting the portion of the bead flipper 3 projecting inwardly of the bead ring 1 (see FIG. 5) so that it extends along one of the respective surfaces of the bead ring 1 and bead filler 2, and erecting the portion of the bead flipper 3, together with the side ply 4, which projects outwardly of the bead ring 1 (see FIG. 6) so that it extends along the other surfaces of the bead ring 1 and bead filler 2, and bending the overlap region of the bead flipper 3, side ply 4 and bead filler 2 so that the side ply 4 lies on the outer side to thereby provide a conical form, either one of the first and second processes being performed first and then the other or both the first and second processes being performed simultaneously, and thereafter the third process being performed.

In the assembling method for forming the bead assembly, since the peripheral speed of the larger-diameter side of the taper drum 11 used in the first process is faster than that of the smaller-diameter side, it follows that when the bead filler 2 is wound around the periphery of the taper drum 11 by fixing the front end of the bead filler 2 to the surface of the taper drum 11 and rotating the latter, the winding proceeds in such a manner that the thin-walled front edge is elongated more than the thick-walled base edge so that opposite ends of the bead filler 2 are endlessly connected together without causing end gapping. And in the second process, the flipper 3 and the side ply 4 are endlessly connected together, and in the third process, the bead filler/bead ring subassembly is fitted on the side ply 4 and flipper 3 wound around the cylindrical forming drum 83 separate from the taper drum 11 and the inner side of said subassembly is wrapped in them, whereupon the bead filler 2, flipper 3 and side ply 4 are bent to one side to provide a conical form, and they are endlessly joined together, thus forming a bead assembly having no end-gap, it being easy to automate the forming of the subassembly.

The bead filler/bead ring subassembly forming apparatus used in the first process in the assembling method described above, comprises a frusto-conical rotatable taper drum 11 adapted to removably receive a bead ring 1 concentrically on its smaller-diameter side surface, filler guide means 15 (see FIGS. 8 and 9) for guiding a bead filler 2 onto the outer peripheral surface of the taper drum 11 so that the thick-walled base portion of the bead filler projects beyond the smaller-diameter side edge of the taper drum 11 and so that the bead filler extends at right angles with the generatrix of the taper drum 11, filler fixing means 30 for removably fixing to the surface of the taper drum 11 the front end of the bead filler fed in through the filler guide means 15, drum driving means 14 for rotating the taper drum 11, a presser roller 36 for pressing the bead filler 2 against the outer peripheral surface of the taper drum 11, and filler bending means 37 whereby the thick-walled base portion of the bead filler 2 projecting from the smaller-diameter side edge of the taper drum 11 is bent along the smaller-diameter side edge of the taper drum 11 and is pressed against the outer peripheral surface of the bead ring 1 attached in advance to the smaller-diameter side surface of the taper drum 11.

According to the bead filler/bead ring subassembly forming apparatus, the bead ring 1 is temporarily fixed to the smaller-diameter side surface of the taper drum 11, while the bead filler 2 is led onto the taper drum 11 by the filler guide means 15 and is temporarily fixed at its front end to the taper drum 11 by the filler fixing means 30. And the bead filler 2 is pressed against the surface of the taper drum 11 by the presser roller 36 while rotating the taper drum 11 by the taper drum driving means 14, whereby the bead filler 2 is continuously drawn out of the filler guide means and wound around the taper drum 11. And the thick-walled side base portion of the bead filler 2 projecting from the smaller-diameter side edge is bent by the filler bending means 37 and bonded to the bead ring 1. After the taper drum 11 has been rotated through one revolution, it is stopped and the bead filler 2 is cut off to leave its portion on the taper drum 11 which is equal in length to the circumference of the taper drum 11, thus providing an endless form of bead filler/bead ring subassembly having no end-gap.

In the bead filler/bead ring subassembly forming apparatus, the taper drum 11 can be installed so that its center line 11a is inclined with respect to the horizontal line so that the generatrix on the top is approximately horizontal. Thereby, the bead filler 2 can be fed flatwise and the winding of the bead filler 2 is facilitated.

The peripheral surface of the taper drum 11 may be defined by a turn-up bladder 17 having a number of ridges extending in the direction of the generatrix, so that the endlessly bonded bead filler 2 placed around the peripheral surface of the turn-up bladder 17 is erected by inflating the turn-up bladder 17.

Thereby, it becomes easy to automatically erect the bead filler 2 and the formation of the ridges 17a on the surface of the turn-up bladder 17 facilitates separation of the bead filler 2 from the surface of the taper drum 11.

The assembling apparatus (see FIGS. 24 and 25) used in the second and third processes in the assembling method and serving to unite the bead filler/bead ring subassembly, the flipper 3 and the side ply 4 comprises a rotatable horizontal main shaft 82 supported in a cantilever fashion, a turn-up bladder 96 which, when contracted, defines the cylindrical surface of the forming drum 83, first and second auxiliary drums formed of a number of radially slidable segments 98 and 99 and adapted, when contracted, to form cylindrical surfaces of the same diameter as that of the turn-up bladder 96 when the latter is in the contracted state, the turn-up bladder and the first and second auxiliary drums being mounted side by side on the main horizontal shaft 82 in the order mentioned as seen from the free end of the horizontal main shaft 82, a turn-up support ring 85 in the form of a hollow cone surrounding the forming drum and axially slidably mounted on the horizontal main shaft 82 nearer to the proximal end of the latter, and a cylindrical pusher ring 70 adapted to surround the forming drum 83 and axially slidably mounted on the horizontal main shaft 82 on the side opposite to the turn-up support ring 85.

Using the assembling apparatus for forming the bead assembly for automobile tires, the second process in the assembling method is performed by winding the side ply 4 around the turn-up bladder 96 which constitutes the forming drum 83 and winding the flipper 3 in such a manner as to cover the first and second segments 98 and 99 (see FIG. 3). Subsequently, the first segments positioned adjacent the turn-up bladder 96 are slightly increased in diameter (see FIG. 4) and the bead filler/bead ring subassembly obtained in the first process is brought onto the horizontal main shaft 82 from its free end and is fitted on the portion of the flipper 3 which is raised by the increase in the diameter of the first segments 98, and then the second segments 99 are increased in diameter (see FIG. 5), thereby bending the flipper 3 on the second segments 99 to erect it, the flipper 3 thus covering one surface of the bonded region of the bead ring 1 and bead filler 2. And the turn-up support ring 85 standing by nearer to the proximal end of the horizontal shaft 82 is advanced to the position where its front end surrounds the second segments 99, whereupon the turn-up bladder 96 is inflated to bend the flipper 3 and the side ply 4 thereon upward. Then, the pusher ring 70 standing by nearer to the free end of the horizontal main shaft 82 is advanced to cause the turn-up bladder 96 to urge the flipper 3 and side ply 4 against the turn-up support ring 85 (see FIG. 6) to connect them together, thereby providing a conical bead assembly 1-4 conforming to the shape of the turn-up support ring 85.

Because of the arrangement for defining the outer surface of the forming drum by the turn-up bladder and first and second segments, increasing the diameter of the auxiliary drum consisting of the first segments, and fitting the bead ring on the flipper mounted on said diameter-increased auxiliary drum, this fitting operation is facilitated. Further, since the flipper projecting from one side of the bead ring fitted on the flipper is bent by increasing the diameter of the auxiliary drum consisting of the second segments, the operation can be made faster than in the conventional apparatus using a turn-up bladder.

The assembling apparatus for forming the bead assembly consisting of the bead ring 1, bead filler 3, flipper 3 and side ply 4 may comprise a horizontal turntable 50 disposed on the floor in the direction of extension of the free end of the horizontal shaft 82, two pairs of guide rails 52 and 53 extending in different directions from the center of rotation of the horizontal turntable, a pusher ring 70 mounted on a slide block 71 slidable along one pair of guide rails 53, an annular holder 54 approximately equal in diameter to the endlessly joined bead filler 2 and mounted on a slide block 56 slidable along the other pair of rails 52, the annular holder 54 being swingable from a vertical position to a forwardly inclined position, a number of suction disks 65 for sucking the bead filler which are fixed on, the annular holder 54, the arrangement being such that the bead filler/bead ring subassembly forming apparatus 10 can be installed in the direction of extension of the guide rails 52 when the guide rails 53 are directed to the horizontal main shaft 82 so that the smaller diameter side of the taper drum 11 is directed to the center of rotation of the horizontal turntable.

Thereby, it becomes possible to automate the series of assembling operations. That is, it is possible to make an arrangement such that after the bead filler/bead ring subassembly has been made on the taper drum, the annular holder 54 opposed to the taper drum 11 is forwardly inclined to press the suction disks 65 against the bead filler 2 on the taper drum 11 to suck and hold the bead filler/bead ring subassembly. Thereafter, the annular holder 54 is brought from the forwardly inclined position back to the vertical position and the bead filler/bead ring subassembly is removed from the taper drum 11. Subsequently, the horizontal turnable 50 is rotated to align the guide rails 52 for the annular holder 54 with the direction of the horizontal main shaft 82 of the assembling apparatus, whereupon the annular holder 54 is advanced to fit the bead filler/bead ring subassembly on the flipper 83 supported on the forming drum 83. Thereafter, the bead filler/bead ring subassembly is released from the sucking disks 65 and then the annular holder 54 is retracted. The flipper 3 and side ply 4 are wound around the bead filler/bead ring subassembly. And the horizontal turntable 50 is rotated again to bring the guide rails 53 for the pusher ring 70 into alignment with the direction of the horizontal main shaft 82, whereupon the pusher ring 70 is advanced to press the turn-up bladder 96 of the forming drum 83, thereby forming the bead assembly.

Further, a number of permanent magnets 101 may be circumferentially equidistantly attached to the inner side of the turn-up bladder 96 constituting the forming drum of the assembling apparatus.

Thereby, when the side ply 4 reinforced with steel wires is wound around the turn-up bladder 96, the side ply 4 can be easily fixed in position.

Further, a tacky portion made of semi-cured chlorobutyl rubber may be provided on part of the outer peripheral surface of the turn-up bladder 96 constituting the forming drum 83.

Thereby, it becomes easy to fix any side ply 4 in position, not restricted to one having steel cords, in winding such side ply.

BRIEF DESCRIPTION OF THE DRAWINGS

FIG. 9 is a sectional view taken along the line IX—IX in FIG. 8;

FIG. 10 is an enlarged sectional view of part of FIG. 9;

FIG. 11 is a sectional view taken along the line XI—XI in FIG. 10;

FIG. 12 is a front view of a modification of the upper portion of the taper drum;

FIG. 13 is a sectional view taken along the line XIII—XIII in FIG. 12;

FIGS. 14 through 22 are views explaining the operation of the bead filler/bead ring subassembly forming apparatus;

DESCRIPTION OF THE PREFERRED EMBODIMENTS

Figure 1:
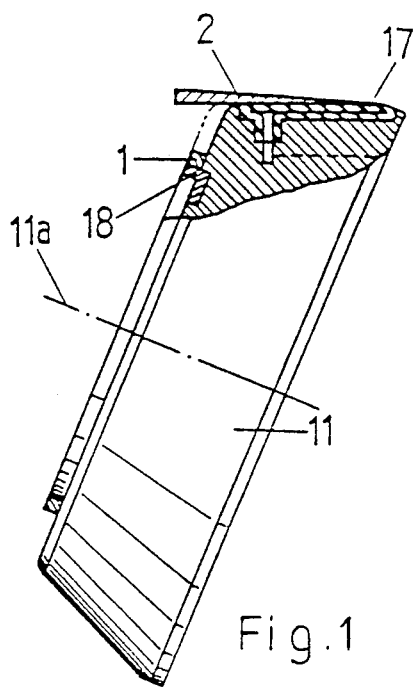
FIG. 1 is a side view, partly broken away, of a taper drum used in this invention.
Figure 26:
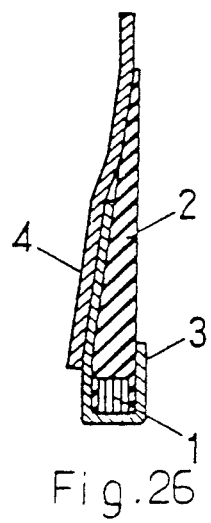
FIG. 26 is a sectional view of the bead assembly.
Figure 27:
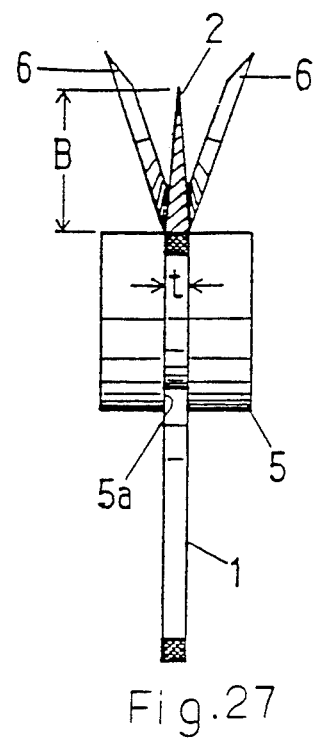
FIG. 27 is a front view of a conventional bead filler/bead ring subassembly forming apparatus.
Figure 7:
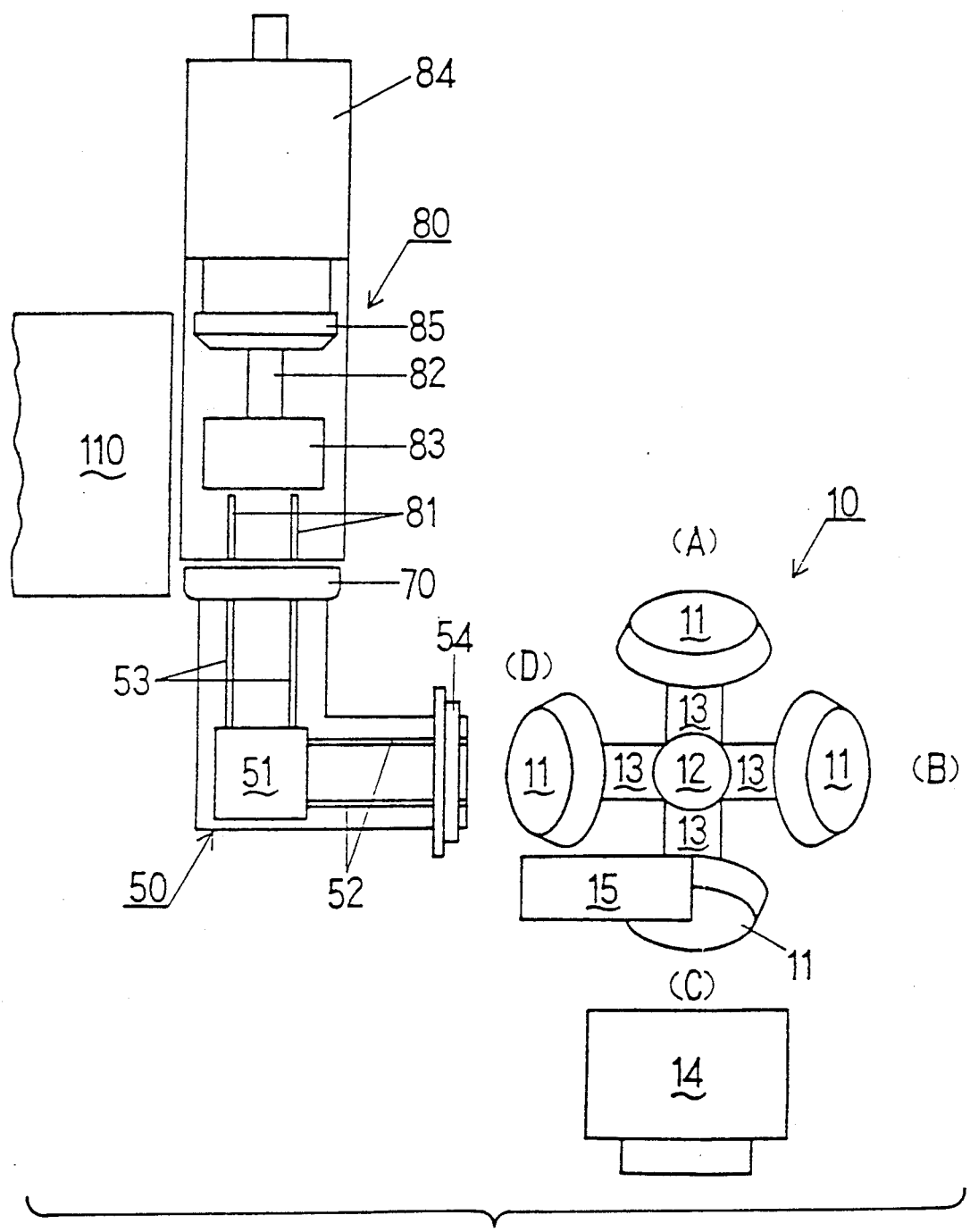
FIG. 7 is a front view of an entire assembling apparatus for forming a bead assembly according to the invention.

FIG. 7 is a plan view of the entire apparatus. A bead filler/bead ring subassembly forming apparatus 10 comprises a vertical main shaft 12, four arms 13 radially extending from the vertical main shaft, each arm 13 having a taper drum 11 rotatably mounted thereon, the vertical main shaft 12 being intermittently rotated clockwise through 90 degrees each time. Each taper drum 11, as shown in FIG. 1, is installed so that its axis 11a is inclined with respect to the horizontal line so that the generatrix on the top is approximately horizontal. The taper drums 11 are revolved or moved in a circular path successively through a first station A located above, a second station B located right, a third station C located below and a fourth station D located left. In the first station A, a bead ring 1 is mounted; in the second station B, the bead ring 1 is centered; in the third station C, the taper drum 11 is rotated by a drum driving device 14 to wind a bead filler 2 being fed in by a filler guide (filler guide means) 15 around the taper drum 11, the base portion of the bead filler 2 being bent; and in the fourth station D, the bead filler/bead ring subassembly is removed from the taper drum 11.

A horizontal turntable 50 is installed in front of the taper drum at the fourth station D and two pairs of guide rails 52 and 53 extend from the center of rotation of the horizontal turntable at right angles to each other to mount slide blocks thereon. An annular holder 54 is slidably mounted on the guide rails 52 extending laterally as seen in FIG. 7 through a slide block, while a pusher ring 70 is slidably mounted on the guide rails 53 extending upward as seen in FIG. 7 through a slide block.

An assembling apparatus 80 for forming a bead assembly is installed in front of the pusher ring 70, i.e., in the direction of extension of the upward guide rails 53. Guide rails 81 which connect to the guide rails 53 are laid on the assembling apparatus 80. A forming drum 83 is supported in a cantilever fashion by a horizontal main shaft 82, and a servicer 110 for supplying the flipper 3 and side ply 4 is disposed at the left of the forming drum 83.

Figure 8:
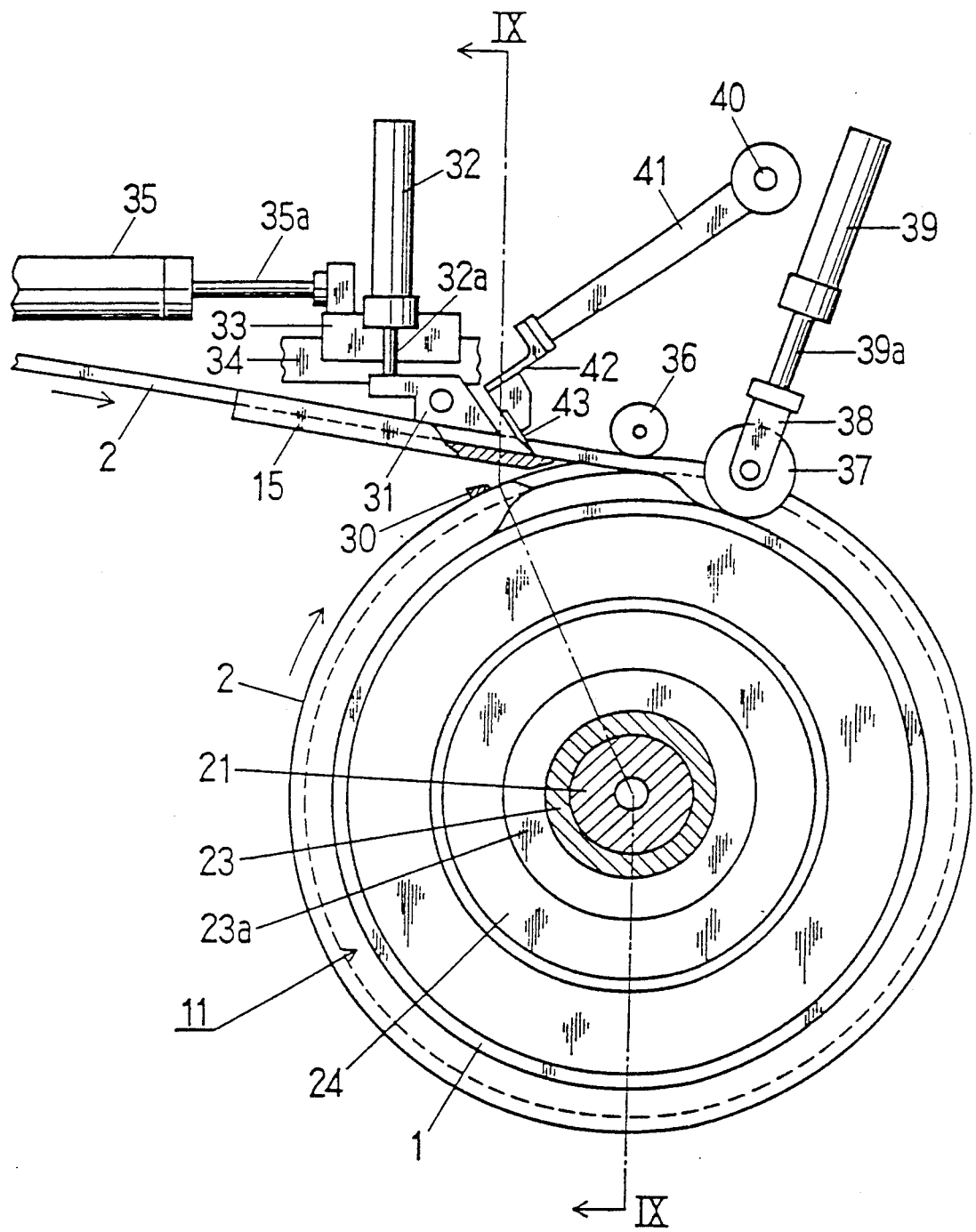
FIG. 8 is a front view of part of an bead filler/bead ring subassembly forming apparatus according to the invention.

FIGS. 8 and 9 show the taper drum 11 in the third station C included in the bead filler/bead ring subassembly forming apparatus 10. As shown in FIGS. 9 and 10, the taper drum 11 comprises a drum body 16 and a turn-up bladder 17 forming the peripheral surface of the drum body and adapted to be expanded and contracted by supplying and discharging air through an air passage 16a formed in the drum body 16. The surface of the turn-up bladder 17 is formed with a number of ridges extending in the direction of the generatrix, as shown in FIG. 11.

Further, as shown in FIGS. 9 and 10, the smaller-diameter side surface of the taper drum 11 is provided with a bead support ring 18 adapted to have a bead ring 1 for automobile tires fitted thereon. A central ring 19 is fixed at the center of the smaller-diameter side surface, and an annular friction clutch plate 20 is fixed on the outer region. On the other hand, a main drive shaft 21 extends from the drum driving device 14 and can be retractably advanced along the center line 11a until a central projection 21a on the front end surface thereof fits in said central ring 19 on the taper drum 11. A slide collar 23 fits between an annular stop 22 fixed on the front end of the main drive shaft 21 and a flange 21b provided above the annular stop. A friction clutch plate 25 is fixed to the lower end flange 23a of the slide collar 23 through a dish-shaped ring 24 and is pressed against the friction clutch plate 20 on the taper drum 11 by a compression coil spring 26 interposed between the flange 21b of the main drive shaft 21 and the lower end flange 23b of the slide collar 23.

A rotary pneumatic cylinder 28 is fixed to the flange 21b of the main drive shaft 21 through an arm 27 and has a rotary shaft 28a to which a top pressing first lever 29 is fixed. A second tip pressing lever 30 is attached to the front end of said first lever by a connecting pin 29a in such a manner as to be rotatable through a predetermined angle and urged clockwise. In addition, the working air for the rotary pneumatic cylinder 28 is supplied through the central hole in the main driving shaft and the central hole in the arm 27. This air supply causes the top pressing first lever 29 to rotate from above to the illustrated position and the second lever 30 to elastically press the tip of the bead filler 2 on the taper drum 11.

The filler guide (filler guide means) 15 is positioned upper left in FIG. 8 and, as shown in FIG. 9, has two upward guides 15a on opposite edges thereof which are in contact with the thick-walled proximal end edge and thin-walled distal end edge of the bead filler 2 so as to guide the bead filler 2 so that it moves at right angles to the generatrix of the top portion of the taper drum 11 and without zigzagging. In addition, one or both of the guides 15a may be made axially movable to adjust the distance therebetween to the width of the bead filler 2.

A vacuum hand 31 positioned above the filler guide 15 serves to such and hold the bead filler 2 on the filler guide 15 to carry its front end to the top of the taper drum 11. The vacuum hand 31 is fixed to the lower end of the piston rod 32a of a vertical hand lifting air cylinder 32, whereby it is lifted and lowered. A slide base 33 to which the hand lifting air cylinder 32 is fixed is guided by a rail 34 extending laterally as seen in FIG. 8 and is connected to the piston rod 35a of a laterally extending hand lifting air cylinder 35 so that it is moved laterally; thus the vacuum hand 31 is moved laterally.

A presser roller 36 is positioned at the right of the filler guide 15 and immediately above the taper drum 11 and adapted to be lifted and lowered by an air cylinder (not shown) disposed thereabove. When lowered, it depresses the bead filler 2 on the taper drum 11, as shown, to fix the bead filler 2 against deviation.

Figure 18:
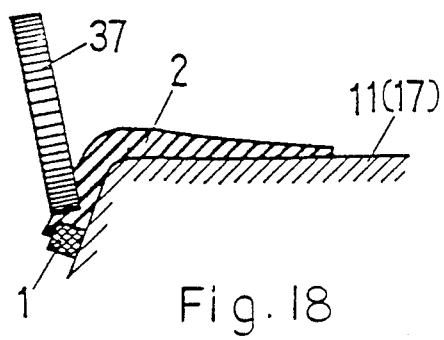

A bending roller 37 disposed at the right of the pressing roller 36 is in the form of a disk having a knurled edge (see FIG. 18) and is adapted to be lifted and lowered as its bracket 38 is fixed to the piston rod 39a of a bending air cylinder 39 disposed thereabove, the arrangement being such that when the bending roller 37 is lowered, its lower surface is opposed to the upper surface of the bead ring 1 on the smaller-diameter side surface of the taper drum 11.

Further, a cutter shaft 40 is installed above the pressing roller 36 to extend widthwise of the bead filler 2 on the filler guide 15. When the cuter shaft 40 is driven by a rotary pneumatic cylinder (not shown), a cutter 43 fixed to the cutter shaft 40 through a cutter arm 41 and cutter holder 42 is swung in a vertical plane so that it widthwise cuts the bead filler 2 on the filler guide 15 when it is lowered.

Figure 17:
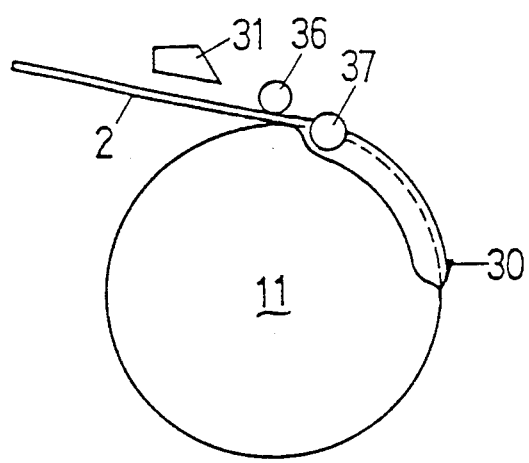
Figure 19:
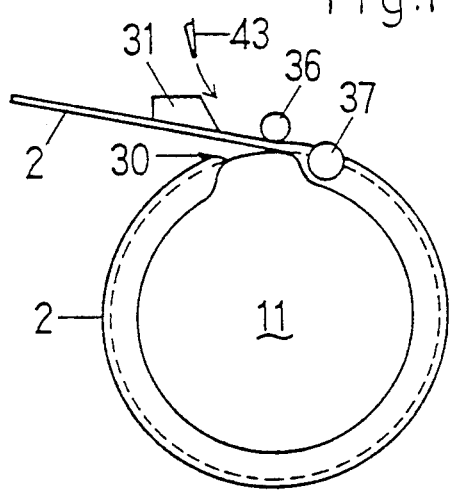
Figure 20:
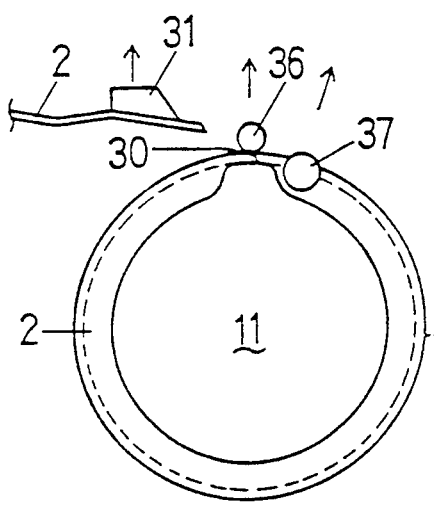

In the bead filler/bead ring subassembly forming apparatus described above, when the taper drum 11 having the bead ring 1 attached thereto is turned to the third station C, the vacuum hand 31, cutter 43, pressing roller 36 and bending roller 37 are all retracted upward to their respective stand-by positions, with the main drive shaft 21 retracted toward the drum driving device 14 and with the tip pressing first and second levers 29 and 30 above the main drive shaft 21 standing by in the upper region. When the vertical main shaft 12 having the taper drums 11 attached thereto is stopped, the hand sliding and lifting air cylinders 35 and 32, respectively, are actuated, causing the vacuum hand 31 to suck the bead filler 2 on the filler guide 15 and carry it onto the taper drum 11 (see FIG. 14), and then the main drive shaft 21 is advanced and connected to the taper drum 11, whereupon the tip pressing rotary pneumatic cylinder 28 is actuated to turn the first lever 29 and hence the front end of the second lever 30 is lowered onto the top of the taper drum 11 to press the front end portion of the bead filler 2 against the taper drum 11, thereby fixing it in position (see FIGS. 14 and 15). Subsequently, the vacuum hand 31 returns to its stand-by position, and the pressing roller 36 is lowered, as shown in FIG. 16. The taper drum 11 is rotated at low speed to start the winding of the bead filler. As shown in FIG. 17, when the tip pressing second lever 30 passes below the bending roller 37, the latter is lowered to bend the bead filler 2 downward while pressing the base portion of the bead filler 2 against the upper surface of the bead ring 1 (see FIG. 18), whereupon the rotation of the taper drum 11 is accelerated. When the taper drum 11 has made approximately one complete revolution as the winding of the bead filler 2 proceeds, the taper drum 11 is decelerated to come to a halt. As shown in FIG. 19, the vacuum hand 31 is lowered again to suck and hold the bead filler 2 on the filler guide 16, whereupon the cutter 43 is lowered to cut the bead filler 2 at the right of the vacuum hand 31. When the cutting is completed, the cutter 43 returns to its stand-by position and, as shown in FIG. 20, the vacuum hand 31, sucking and holding the front end of the bead filler 2, is lifted to stand by for the next winding. On the other hand, the taper drum 11 starts to rotate at low speed again and the pressing roller 36 presses the opposite ends of the bead filler 2 to connect them together (see FIG. 20). The pressing roller 36 is lifted, the taper drum 11 stops rotating, the bending roller 37 and tip pressing first and second levers 29 and 30 are lifted and, the main drive shaft 21 is retracted to cut off the connection between it and the taper drum 11, thus completing the operation in the third station C.

Figure 21:
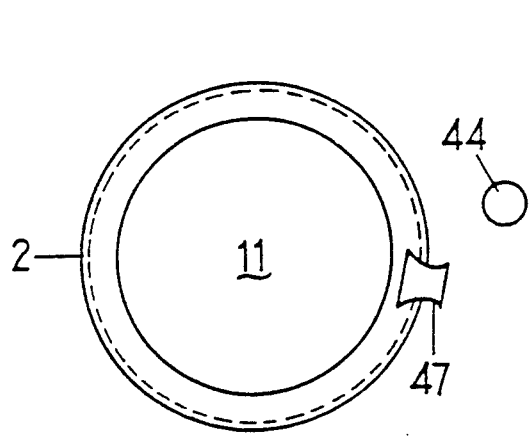
Figure 22:
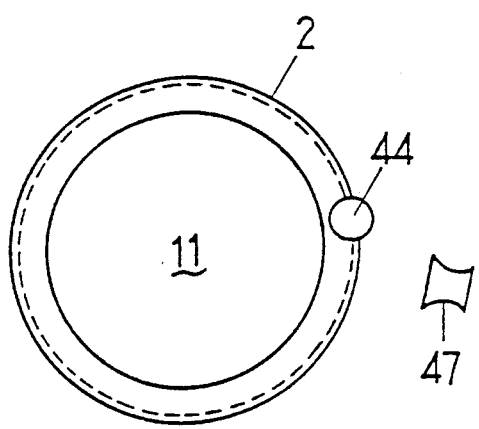

In the third station C, a stitcher roller 44 and a washer roll 47 may be provided in a region spaced about 90 degrees clockwise away from the bending roller 37, as shown in FIGS. 12 and 13. The stitcher roller 44 is in the form of a disk similar to the bending roller 37 and is attached to the lower end of the piston rod 45a of a stitcher air cylinder 45 through a bracket 46, so that when the piston rod 45a is extended, the stitcher roller 44, like the bending roller 37, presses the bead filler 2 against the upper surface of the bead ring 1 on the smaller-diameter side surface of the taper drum 11, thereby making the bond firmer. The washer roll 47 disposed below the level of the stitcher roller 44 is formed of a number of thin apertured disks of different sizes rotatably put together into a roller form having a groove of hourglass-shaped cross section and connected to the front end of the piston rod 48a of a washer air cylinder 48 through a bracket 49, so that when the piston rod 48a is extended, it is contacted with the smaller-diameter side edge of the taper drum 11 to press the bend of the bead filler for reformation. That is, after the tip pressing first and second levers 29 and 30 have returned to their stand-by positions, the washer roll 47 is actuated (see FIG. 21) to ensure the bending of the joined region at the opposite ends of the bead filler 2, and then the washer roll 47 is returned to its stand-by position and the stitcher roller 44 is actuated (see FIG. 22) to connect the base portion of the bead filler 2 firmly to the bead ring 1. Upon completion of this finish connection, the taper drum 11 stops rotating and the connection between it and the main drive shaft 21 is cut off.

Figure 2:
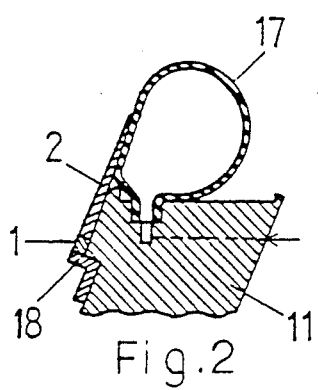
FIGS. 2 through 6 are sectional views for explaining an assembling method according to this invention.

When the connection between the taper drum 11 and the main drive shaft 21 is cut off, the vertical main shaft 12 of the taper drum 11 is rotated through 90 degrees, so that the bead filler/bead ring subassembly is transferred on the taper drum 11 from the third station C to the fourth station D. Pressurized air is supplied to the turn-up bladder 17 of the taper drum 1 to inflate said turn-up bladder 17 (see FIG. 2) to erect the front end portion of the bead filler 2. In this case, since the surface of the turn-up bladder 17 is formed with ridges 17a, the quality of sliding movement between the surface of the turn-up bladder 17 and the bead filler 2 is improved, whereby the erection of the bead filler 2 is facilitated.

Figure 23:
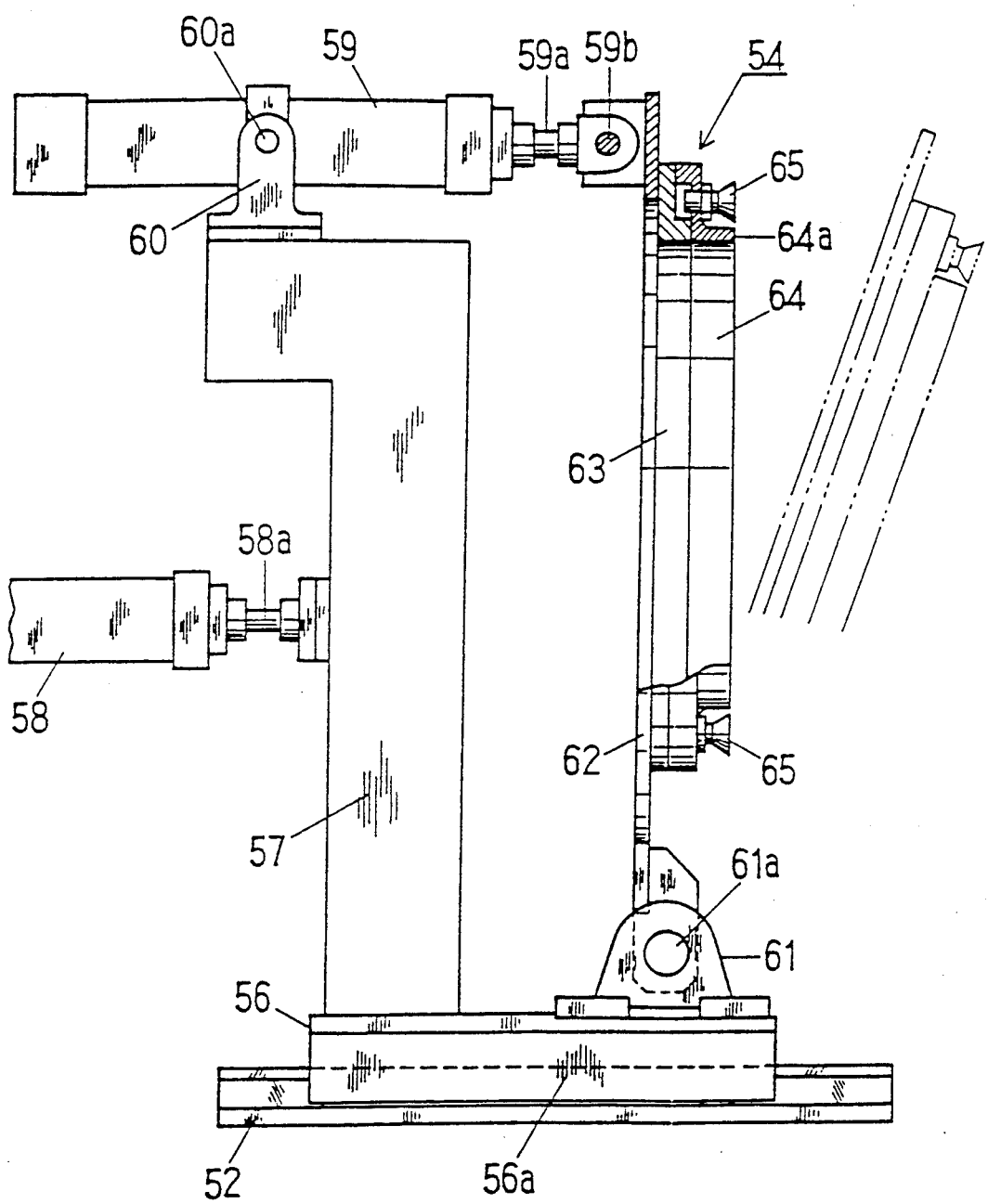
FIG. 23 is a side view of an annular holder.
Figure 24:
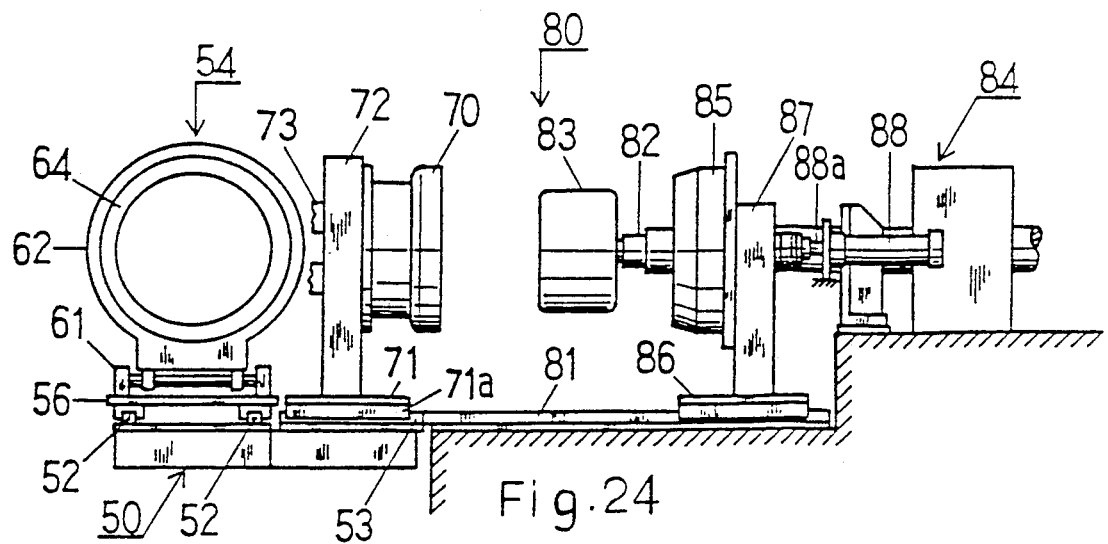
FIG. 24 is a front view of the assembling apparatus for forming the bead assembly.

An annular holder 54 for withdrawing the bead filler/bead ring subassembly erected by the turn-up bladder 17 of the taper drum 11 is shown in FIGS. 23 and 24. The annular holder 54 is installed on guide rails 52 laid on the L-shaped horizontal turntable 50 shown in FIG. 7. That is, the legs 56a of the slide block 56 slidably fit on the pair of guide rails 52. And connected to the back of a pillar 57 erected on the rear portion (the left-hand side portion, as seen in FIG. 23) of said slide block 56 is the front end of the piston rod 58a of a hydraulic cylinder 58 for the holder horizontally installed near to the center of rotation of the horizontal turntable 50. The actuation of the hydraulic cylinder 58 moves the slide block 56 along the guide rails 52.

A hydraulic cylinder 59 for forwardly tilting the annular holder 54 is installed on the upper end of the pillar 57 and is swingably supported at its middle portion by a bracket 60 on the pillar 57 through a pin 60a. The upper end of the annular holder 54 is connected to the front end of the piston rod 59a by a connecting pin 59b. The lower end of the annular holder 54 is connected to a bracket 61 on the slide block 56 by a connecting pin 61a. When the piston rod 59a of the hydraulic cylinder 59 is retracted, the annular holder 54 assumes a substantially vertical position shown in solid lines, and when the piston rod 59a is extended, the annular holder 54 assumes a forwardly inclined position shown in chain lines, it being arranged that this inclination coincides with the inclination of the taper drum 11. Thus, said annular holder 54 comprises an annular frame 62 extending between the front end of the piston rod 59a disposed above and the bracket 61, an intermediate ring 63 fixed to the front surface of the annular frame 62 and a front ring 64 fixed to the front surface of the intermediate ring 63. The front ring 64 has a forwardly projecting edge 64a disposed along the inner periphery thereof, and a number of suction disks 65 fixed to the outer side of the projecting edge 64a, said suction disks 65 being adapted to contact the bead filler 2 erected on the taper drum 11 (see FIG. 2).

More particularly, the piston rod 58a of the hydraulic cylinder 58 for the holder is extended to advance the slide block 56 toward the taper drum 11 in the fourth station D and at the advance position the piston rod 59a of the hydraulic cylinder 59 is extended to bring the suction disks 65 into contact with the bead filler 2 on the taper drum 11, whereupon the low pressure source connected to the suction disks is actuated. As a result, the bead filler/bead ring subassembly is sucked and held by the suction disks 65 of the annular holder 54. When the piston rod 59a of the forwardly tilting hydraulic cylinder 59 is retracted, the annular holder 54 is returned to its vertical position, and said subassembly is removed from the taper drum 11.

The slide block 71 for pusher ring 70 is slidably mounted on the other pair of guide rails 53 on the horizontal turntable 50 (see FIGS. 7 and 24) through its legs 71a. Fixed to a pillar 72 erected on the slide block 71 is the concentric pusher ring 70 surrounding a forming drum 83. The piston rod 73 to a hydraulic cylinder for the pusher ring is connected to the back of the pillar 72, so that when the piston rod 73 is extended, the pusher ring 70 is advanced toward the forming drum 83.

The assembling apparatus 80 positioned in the direction of advance of the pusher ring 70, as shown in FIG. 24, comprises guide rails 81 laid on the floor located in the extension of the guide rails 53 for the pusher ring 70, a horizontal main shaft 82 positioned above the guide rails 82, a forming drum 83 attached to the free end of the horizontal main shaft 82, a headstock 84 supporting the horizontal main shaft in a cantilever fashion, and a turn-up support ring 85 concentric with the forming drum 83, the turn-up support ring 85 being fixed on a slide block 86 slidable along the guide rails 81 through a support frame 87 which, in turn, is connected to the front ends of the piston rods 88a of a pair of hydraulic cylinders 88 positioned on opposite sides of the horizontal main shaft 82, so that the actuation of the hydraulic cylinders 88 advance and retracts the support frame 87 on said guide rails 81.

Figure 25:
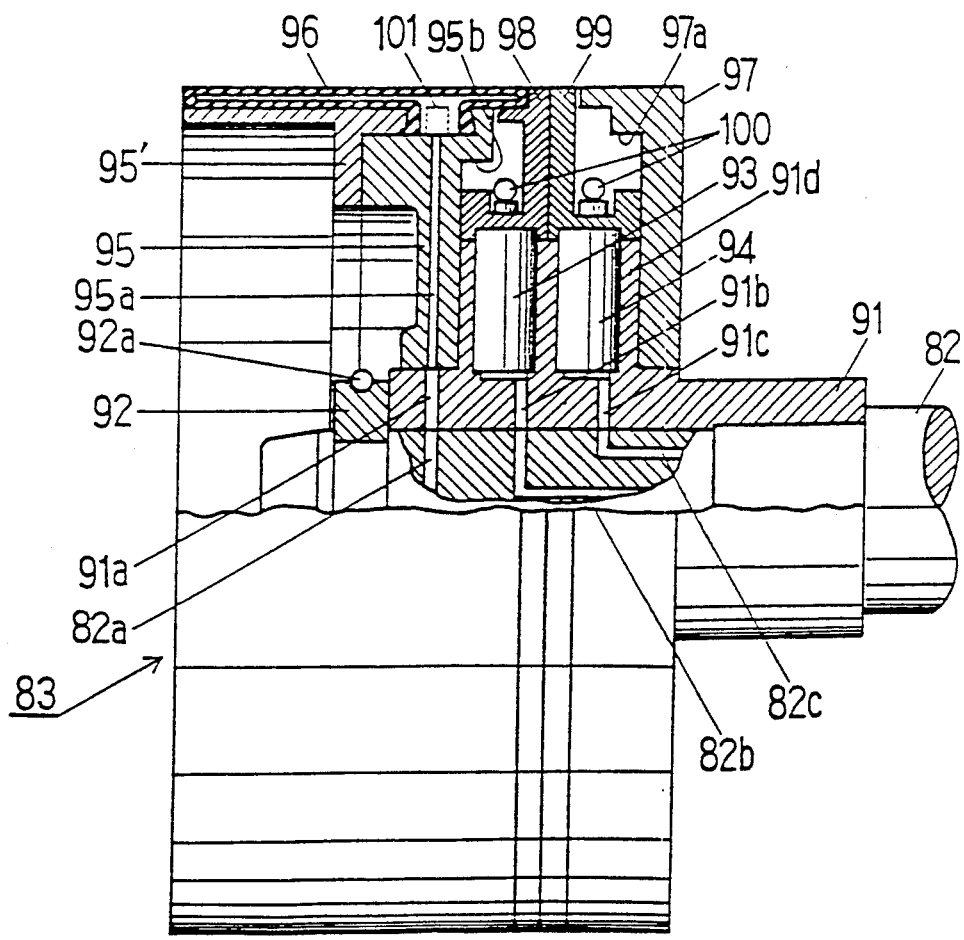
FIG. 25 is a front view, partly broken away, of a forming drum shown in FIG. 24.

The details of the forming drum 83 are shown in FIG. 25. A drum boss 91 is fixed on the free end of the horizontal main shaft 82 by a split ring 92 and an annularly connected coil spring 92a. The drum boss 91 has a flange portion 91d having rows of radial cylinder holes formed in the peripheral surface thereof, with pistons 93 and 94 fitted in the cylinder holes. The bottoms of the cylinder holes are connected to a high pressure source associated with the headstock through air supply holes 91b and 91c in the drum boss 91 and air supply holes 82b and 82c in the horizontal main shaft 82.

A flange-like bladder fixing ring 95 larger in outer diameter than the flange portion 91d is fixed on the front surface (left-hand side surface in the figure) of the flange portion 91d of the drum boss 91, and a cylindrical bladder receiving ring 95' is fixed to the front surface of the bladder fixing ring 95. The mouth of a turn-up bladder 96 is fixed to the peripheral surface of the bladder fixing ring 95. The outer surface of the turn-up bladder 96 defines the cylindrical forming drum surface when the bladder 96 is contracted. The mouth of the turn-up bladder 96 is connected to the high pressure source associated with the headstock through an air supply hole 95a formed in the bladder fixing ring 95, an air supply hole 91a formed in the drum boss 91 and an air supply hole 82a formed in the horizontal main shaft. On the other hand, a guide ring 97 is fixed to the rear surface of the flange portion 91d of the drum boss 91 and its outer peripheral surface defines the outer surface of the forming drum 83.

A number of auxiliary drum forming first and second segments 98 and 99 are interposed between the bladder fixing ring 95 and the guide ring 97 to surround the flange portion 91d of the drum boss 91. When the front and rear first and second segments 98 and 99 come in contact with the outer end surfaces of the front and rear pistons 93 and 94, respectively, the outer surfaces of the first and second segments 98 and 99 cooperate with the turn-up bladder 96 which is in its contracted state and with the guide ring 97 to define the outer surface of the forming drum 83. These first and second segments 98 and 99 are urged in the centripetal direction by endless coil springs 100, 100 fitted on the inner edges of all first segments 98 and all second segments 99, respectively. The rear surface of the bladder fixing ring 95 adjacent the front surfaces of the first segments 98 is formed with a step 95b which serves as a stop for restricting the outward slide movement of the first segments. A step 97a formed on the front surface of the guide ring 97 adjacent the rear surfaces of the rear segments 99 acts as a stop for restricting the outward slide movement of the second segments 99. In addition, the step 95b of the bladder fixing ring 95 is positioned radially inwardly of the step 97a, and the stroke of the first segments 98 is shorter than that of the second segments 99. In addition, a number of permanent magnets 101 may be circumferentially arranged on the attaching base for the turn-up bladder 96.

Figure 3:
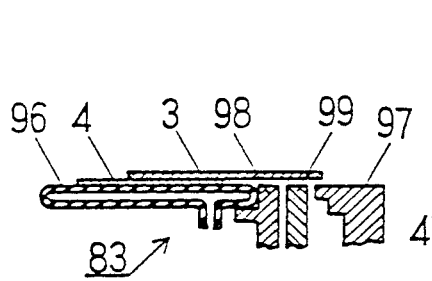
Figure 4:
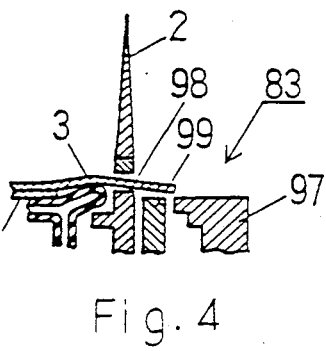
Figure 5:
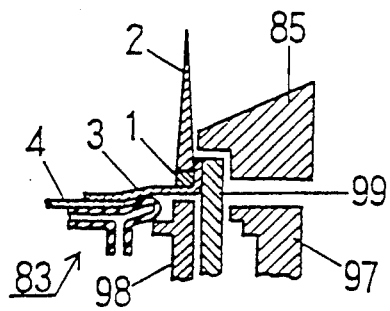
Figure 6:
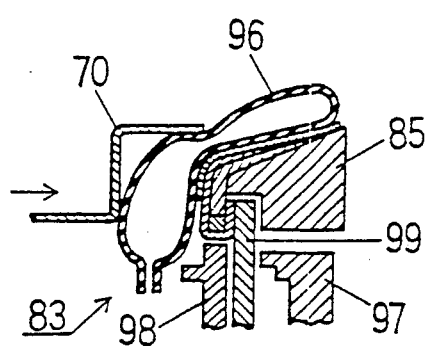

The forming drum 83 described above is rotated by the horizontal main shaft 82 to wind the side ply 4 and flipper 3 therearound (see FIG. 3) which are fed from the servicer 110 (see FIG. 7), and then pressurized air is fed to the front cylinders in the flange portion 91d of the drum boss 91 to push out the first segments 98 so as to increase the diameter of the auxiliary drum consisting of the first segments 98 (see FIG. 4). On the other hand, with the bead filler/bead ring subassembly sucked and held by the annular holder 54 on the horizontal turntable 50, the horizontal turntable 50 is rotated to connect the guide rails 52 for the annular holder 54 to guide rails 81 for the assembling apparatus 80, whereupon the piston rod 58a of the hydraulic cylinder 58 for the holder is extended to advance the slide block 56 toward the forming drum 83, whereby the bead ring of the subassembly sucked and held by the annular holder 54 is fitted on the flipper 3 held on the forming drum 83 (see FIG. 4). Then, the second segments 99 are pushed out by the rear pistons 94 in the flange portion 91d of the drum boss 91 of the forming drum 83 to increase the diameter of the auxiliary drum consisting of the second segments 99 (see FIG. 5), thereby bending one side of the flipper 3. Subsequently, the hydraulic cylinders 88 (see FIG. 24) for the support ring associated with the headstock 84 are actuated to advance the turn-up support ring 85 toward the forming drum 83 to come near the back of the erected bead filler 2 (see FIG. 5). Thereafter, the sucking force exerted by the annular holder 54 on the bead filler/bead ring subassembly is removed and the annular holder 54 is retracted on the turntable 50, and then the latter is turned through 90 degrees to connect the guide rails 53 for the pusher ring 70 to the guide rails 81 for the assembling apparatus 80. Meanwhile, compressed air is supplied to the turn-up bladder 96 of the forming drum 83 to inflate it (see FIG. 6) to bend the remaining half of the flipper together with the side ply 4 to erect them. And the pusher ring 70 on the horizontal turntable 50 is thrust out onto the guide rails 81 for the assembling apparatus 80, bending side the ply 4 and flipper 3 toward the headstock 84 by the front edge of the pusher ring 70 through the erected turn-up bladder 96 so as to cause the side ply 4 and flipper 3 to conform to the shape of the outer surface of the turn-up support ring 85.

What is claimed is:

1. An assembling method for forming a bead assembly for automobile tires comprising first, second and third series of steps, wherein the first series of steps are performed before, after or simultaneously with the second series of steps and the third series of steps are performed after the first and second series of steps, the first series of steps comprising placing a bead ring onto the smaller-diameter side surface of a taper drum, winding a bead filler having a thick-walled portion and a thin-walled portion completely around the peripheral surface of the taper drum such that the thick-walled portion thereof projects beyond the smaller-diameter side edge of the taper drum, bonding the ends of said bead filler together into an endless form, bending the thick-walled portion of said bead filler along the smaller-diameter side edge to join the thick-walled portion to the outer periphery of said bead ring to form a bead ring/bead filler subassembly while the thin-walled portion remains on the peripheral surface of the drum, and separating the thin-walled portion of the bead filler from the peripheral surface of the taper drum; the second series of steps comprising winding a side ply around the outer periphery of a cylindrical forming drum, bonding the ends of the side ply together into an endless form, winding a bead flipper around the upper surface of said side ply such that part of said bead flipper projects in an inward direction beyond the edge of said side ply to overlap the latter, and joining the ends of said bead flipper together into an endless form; and the third series of steps comprising removing the bead filler/bead ring subassembly from the taper drum, placing the bead filler/bead ring subassembly on the single layer portion of the bead flipper disposed on the cylindrical forming drum, bending the portion of the bead flipper projecting inwardly of the bead ring such that the portion of the bead flipper projecting inwardly extends along the inner surfaces of the bead ring and bead filler, bending the portion of the bead flipper, together with the side ply, which projects outwardly of the bead ring such that it extends along the outer surfaces of the bead ring and bead filler, and bending the overlap region of the bead flipper, side ply and bead filler such that the side ply lies on the outward periphery to thereby provide a conical form of the bead assembly.

* * * * *